(12) United States Patent
Ali et al.

(10) Patent No.: US 12,677,827 B2
(45) Date of Patent: Jul. 14, 2026

(54) SYSTEMS, DEVICES, AND METHODS FOR PRESERVING AN ORGAN FOR TRANSPLANTATION

(71) Applicant: Traferox Technologies Inc., Toronto (CA)

(72) Inventors: Aadil Ali, Brampton (CA); Mathieu Allard, Mississauga (CA); Alexander Shvartsberg, Oakville (CA)

(73) Assignee: Traferox Technologies Inc., Mississauga (CA)

( * ) Notice: Subject to any disclaimer, the term of this patent is extended or adjusted under 35 U.S.C. 154(b) by 0 days.

(21) Appl. No.: 19/030,621

(22) Filed: Jan. 17, 2025

(65) Prior Publication Data

US 2025/0160320 A1 May 22, 2025

Related U.S. Application Data

(63) Continuation of application No. 18/888,672, filed on Sep. 18, 2024.

(Continued)

(51) Int. Cl.
A01N 1/00 (2006.01)
A01N 1/147 (2025.01)
(Continued)

(52) U.S. Cl.
CPC .............. A01N 1/147 (2025.01); A01N 1/16 (2025.01)

(58) Field of Classification Search
CPC ........ A01N 1/146; A01N 1/148; C12M 21/08
See application file for complete search history.

(56) References Cited

U.S. PATENT DOCUMENTS 5,395,314 A * 3/1995 Klatz ...................... A01N 1/10
604/24
5,494,822 A 2/1996 Sadri
(Continued)

FOREIGN PATENT DOCUMENTS

CA 2830225 A1 9/2012
CA 3066625 A1 12/2018
(Continued)

OTHER PUBLICATIONS

English translation of NL 1024022 to van der Plaats et al (generated 2025).*

(Continued)

*Primary Examiner* — Nathan A Bowers
(74) *Attorney, Agent, or Firm* — Morrison & Foerster LLP

(57) ABSTRACT

A method of storing a donor organ prior to implantation into an organ recipient includes bagging the donor organ by placing the donor organ into at least one bag and sealing the at least one bag; placing the bagged donor organ into a portable storage container; placing at least one cooling pack in the portable storage container, wherein the at least one cooling pack is configured to maintain a temperature of the donor organ at 8 to 12 degrees C. during storage of the donor organ, and storing the donor organ in the portable storage container prior to transplanting the donor organ into the organ recipient, wherein the portable storage container does not contain any ice at any time during storage of the donor organ.

21 Claims, 4 Drawing Sheets

Related U.S. Application Data

(60) Provisional application No. 63/583,926, filed on Sep. 20, 2023.

(51) Int. Cl.
*A01N 1/16* (2025.01)
*C12M 1/00* (2006.01)

(56) References Cited

U.S. PATENT DOCUMENTS

| | | | |
|---|---|---|---|
| 8,354,221 | B2 | 1/2013 | Roy et al. |
| D692,159 | S | 10/2013 | Judson et al. |
| D692,160 | S | 10/2013 | Judson et al. |
| D697,224 | S | 1/2014 | Judson et al. |
| 8,785,116 | B2 | 7/2014 | Anderson et al. |
| D713,972 | S | 9/2014 | Judson et al. |
| D714,461 | S | 9/2014 | Judson et al. |
| D714,462 | S | 9/2014 | Judson et al. |
| 8,828,710 | B2 | 9/2014 | Anderson et al. |
| 8,835,158 | B2 | 9/2014 | Judson et al. |
| 9,155,297 | B2 | 10/2015 | Anderson et al. |
| 9,253,976 | B2 | 2/2016 | Anderson et al. |
| 9,426,979 | B2 | 8/2016 | Anderson et al. |
| D765,874 | S | 9/2016 | Judson et al. |
| 9,560,846 | B2 | 2/2017 | Anderson et al. |
| D787,696 | S | 5/2017 | Schmieta et al. |
| 9,706,769 | B2 | 7/2017 | Taylor et al. |
| 9,867,368 | B2 | 1/2018 | Anderson et al. |
| 9,936,689 | B2 | 4/2018 | Anderson et al. |
| D819,223 | S | 5/2018 | Judson et al. |
| 11,089,775 | B2 | 8/2021 | Anderson et al. |
| 11,166,452 | B2 | 11/2021 | Judson et al. |
| 11,178,866 | B2 | 11/2021 | Anderson et al. |
| 11,632,951 | B2 | 4/2023 | Collette et al. |
| 11,856,944 | B2 | 1/2024 | Hassanein |
| 2005/0221269 | A1* | 10/2005 | Taylor ............... A01N 1/10 |
| | | | 435/1.1 |
| 2008/0145919 | A1 | 6/2008 | Franklin et al. |
| 2009/0078699 | A1* | 3/2009 | Mustafa ......... B65D 81/3862 |
| | | | 220/592.2 |
| 2009/0291486 | A1 | 11/2009 | Wenrich |
| 2010/0121273 | A1* | 5/2010 | Kochanek ............ A61F 7/12 |
| | | | 604/113 |
| 2013/0177899 | A1 | 7/2013 | Taylor et al. |
| 2019/0098892 | A1 | 4/2019 | Gil |
| 2019/0208768 | A1 | 7/2019 | Thatte et al. |
| 2020/0138015 | A1 | 5/2020 | Bagnato et al. |
| 2021/0337781 | A1 | 11/2021 | Judson et al. |
| 2021/0337782 | A1 | 11/2021 | Freed |
| 2021/0392873 | A1 | 12/2021 | Anderson et al. |
| 2021/0400952 | A1 | 12/2021 | Judson et al. |
| 2021/0400953 | A1 | 12/2021 | Anderson et al. |
| 2022/0000099 | A1 | 1/2022 | Collette et al. |
| 2022/0007638 | A1 | 1/2022 | Judson et al. |
| 2022/0256838 | A1 | 8/2022 | Anderson et al. |
| 2022/0322658 | A1 | 10/2022 | Keshavjee et al. |
| 2023/0148588 | A1 | 5/2023 | Liu et al. |
| 2023/0284614 | A1 | 9/2023 | Anderson et al. |
| 2023/0292742 | A1 | 9/2023 | Anderson et al. |

FOREIGN PATENT DOCUMENTS

| | | | | |
|---|---|---|---|---|
| CA | 3149024 | A1 | 3/2021 | |
| CA | 3166611 | A1 | 8/2021 | |
| EP | 2685814 | A2 | 1/2014 | |
| EP | 2882660 | A1 | 6/2015 | |
| EP | 2897459 | A2 | 7/2015 | |
| EP | 3634127 | A1 | 4/2020 | |
| EP | 3982725 | A1 | 4/2022 | |
| EP | 4017262 | A1 | 6/2022 | |
| EP | 4096399 | A1 | 12/2022 | |
| NL | 1024022 | C2 * | 2/2005 | ............ A01N 1/148 |
| WO | 2012/125782 | A2 | 9/2012 | |
| WO | 2014/026119 | A1 | 2/2014 | |
| WO | 2014/026128 | A2 | 2/2014 | |
| WO | 2018/226993 | A1 | 12/2018 | |
| WO | 2020/252148 | A1 | 12/2020 | |
| WO | 2021/041181 | A1 | 3/2021 | |
| WO | 2021/155147 | A1 | 8/2021 | |
| WO | 2023/215611 | A1 | 11/2023 | |

OTHER PUBLICATIONS

International Search Report and Written Opinion mailed Jan. 15, 2025, directed to International Application No. PCT/CA2024/051239; 10 pages.

Ali et al. (Apr. 2023). "Extension of Cold Static Donor Lung Preservation at 10° C.," NEJM Evidence 2(6): 1-8.

Bhat et al. (Jul. 2021). "Normothermic Ex Situ Liver Perfusion Enhances Mitochondrial Function of DCD Grafts as Evidenced by High-throughput Metabolomics," Transplantation 105(7): 1530-1538.

Buchko et al. (2019). "Total parenteral nutrition in ex vivo lung perfusion: Addressing metabolism improves both inflammation and oxygenation," Am J Transplant 19: 3390-3397.

Burki et al. (2021). "Impact of Triptolide during Ex Vivo Lung Perfusion on Grafts After Transplantation in a Rat Model," The Journal of Thoracic and Cardiovascular Surgery 161(1): e65-e74.

Campo-Cañaveral de la Cruz et al. (May 2023). "Overcoming the Limits of Lung Transplantation: 10° C. Static Cold Preservation," Archivos de Bronconeumología 59: 282-283.

Christie et al. (Nov. 2010). "Construct validity of the definition of primary graft dysfunction after lung transplantation," Journal of Heart and Lung Transplantation 29(11): 1231-1239.

Cypel et al. (2011). "Normothermic Ex Vivo Lung Perfusion in Clinical Lung Transplantation," The New England Journal of Medicine 364(15): 1431-40.

Cypel et al. (Dec. 2008). "Technique for Prolonged Normothermic Ex Vivo Lung Perfusion," Journal of Heart and Lung Transplantation 27(12): 1319-1325.

Cypel et al. (Jun. 2009). "Normothermic Ex Vivo Perfusion Prevents Lung Injury Compared to Extended Cold Preservation for Transplantation," American Journal of Transplantation 9(10): 2262-2269.

Date et al. (Apr. 1992). "In a canine model, lung preservation at 10° C. is superior to that at 4° C.," Journal of Thoracic and Cardiovascular Surgery 103(4):773-780.

Date et al. (Mar. 1993). "Evaluation of lung metabolism during successful twenty-four-hour canine lung preservation," Journal of Thoracic and Cardiovascular Surgery 105(3): 480-491.

De Perrot et al. (2003). "Ischemia-Reperfusion-induced Lung Injury," American Journal of Respiratory and Critical Care Medicine 167(4): 490-511.

Divithotawela et al. (Dec. 2019). "Long-term Outcomes of Lung Transplant With Ex Vivo Lung Perfusion," JAMA Surgery 154(12): 1143-1150.

Examination Report dated Jul. 2, 2025, directed to EP Application No. 22167019.3; 8 pages.

Extended European Search Report dated Oct. 24, 2022, directed to EP Application No. 22167019.3; 12 pages.

Fujinaga et al. (Nov. 2006). "Isoflurane Inhalation After Circulatory Arrest Protects Against Warm Ischemia Reperfusion Injury of the Lungs," Transplantation 82(9): 1168-1174.

Galasso et al. (Jan. 2019). "Inactivating Hepatitis C Virus in Donor Lungs Using Light Therapies During Normothermic Ex Vivo Lung Perfusion," Nature Communications 10(1): 1-12.

Hozain et al. (Apr. 2020). "Multiday maintenance of extracorporeal lungs using cross-circulation with conscious swine," The Journal of Thoracic and Cardiovascular Surgery 159(4): 1640-1653.

Hsin et al. (Jan. 2016). "Extension of donor lung preservation with hypothermic storage after normothermic ex vivo lung perfusion," Journal of Heart and Lung Transplantation 35(1): 130-136.

Kayano et al. (Nov. 1999). "Identification of Optimal Conditions for Lung Graft Storage with Euro-Collins Solution by Use of a Rat Orthotopic Lung Transplant Model," American Heart Association 100(2): 1-10.

(56)     References Cited

OTHER PUBLICATIONS

Keshavjee et al., U.S. Office Action dated Jun. 2, 2025, directed to U.S. Appl. No. 17/714,593; 18 pages.

Keshavjee et al., U.S. Office Action dated Nov. 7, 2024, directed to U.S. Appl. No. 17/714,593; 15 pages.

Keshavjee et al., U.S. Office Action mailed Feb. 1, 2024, directed to U.S. Appl. No. 17/714,593; 12 pages.

Koike et al. (Dec. 2011). "Kinetics of lactate metabolism during acellular normothermic ex vivo lung perfusion," Journal of Heart and Lung Transplantation 30(12): 1312-1319.

Loor et al. (Oct. 2017). "Prolonged EVLP Using OCS Lung: Cellular and Acellular Perfusates," Transplantation 101(10): 2303-2311.

Noda et al. (2014). "Successful prolonged ex vivo lung perfusion forgraft preservation in rats," European Journal of Cardio-Thoracic Surgery 45: e54-e60.

Raemdonck et al. (2014). "Ex-vivo lung perfusion," Transplant International 28(6): 643-56.

Senior, Melanie. (Jun. 2018). "Beating the organ clock," Nature Biotechnology 36(6): 488-492.

Sig Uoft. "Transplant Surgery and Engineering Super-Organs—Dr. Shaf Keshavjee," located at https://www.youtube.com/watch?v=YxcgmKBrpUs, visited on Oct. 12, 2022. 2 pages.

Tikkanen et al. (Apr. 2015). "Functional outcomes and quality of life after normothermic ex vivo lung perfusion lung transplantation," Journal of Heart and Lung Transplantation 34(4): 547-556.

Ueda et al. (1999). "Mitochondrial Injuries in Rat Lungs Preserved for 17 h: An Ultrastructural Study," European Surgical Research 31: 162-172.

Wang et al. (1989). "The effect of ischemic time and temperature on lung preservation in a simple ex vivo rabbit model used for functional assessment," The Journal of Thoracic and Cardiovascular Surgery 98(3): 333-342.

Wang et al. (Dec. 2018). "Irisin protects heart against ischemia-reperfusion injury through a SOD2-dependent mitochondria mechanism," J Cardiovasc Pharmacol 72(6): 259-269.

Wei et al. (Feb. 2020). "Ex vivo lung perfusion with perfusate purification for human donor lungs following prolonged cold storage," Annals of Translational Medicine 8(3): 1-9.

Yeung et al. (Feb. 2017). "Outcomes after transplantation of lungs preserved for more than 12 h: a retrospective study," Lancet Respir Med 5:119-124.

* cited by examiner

200

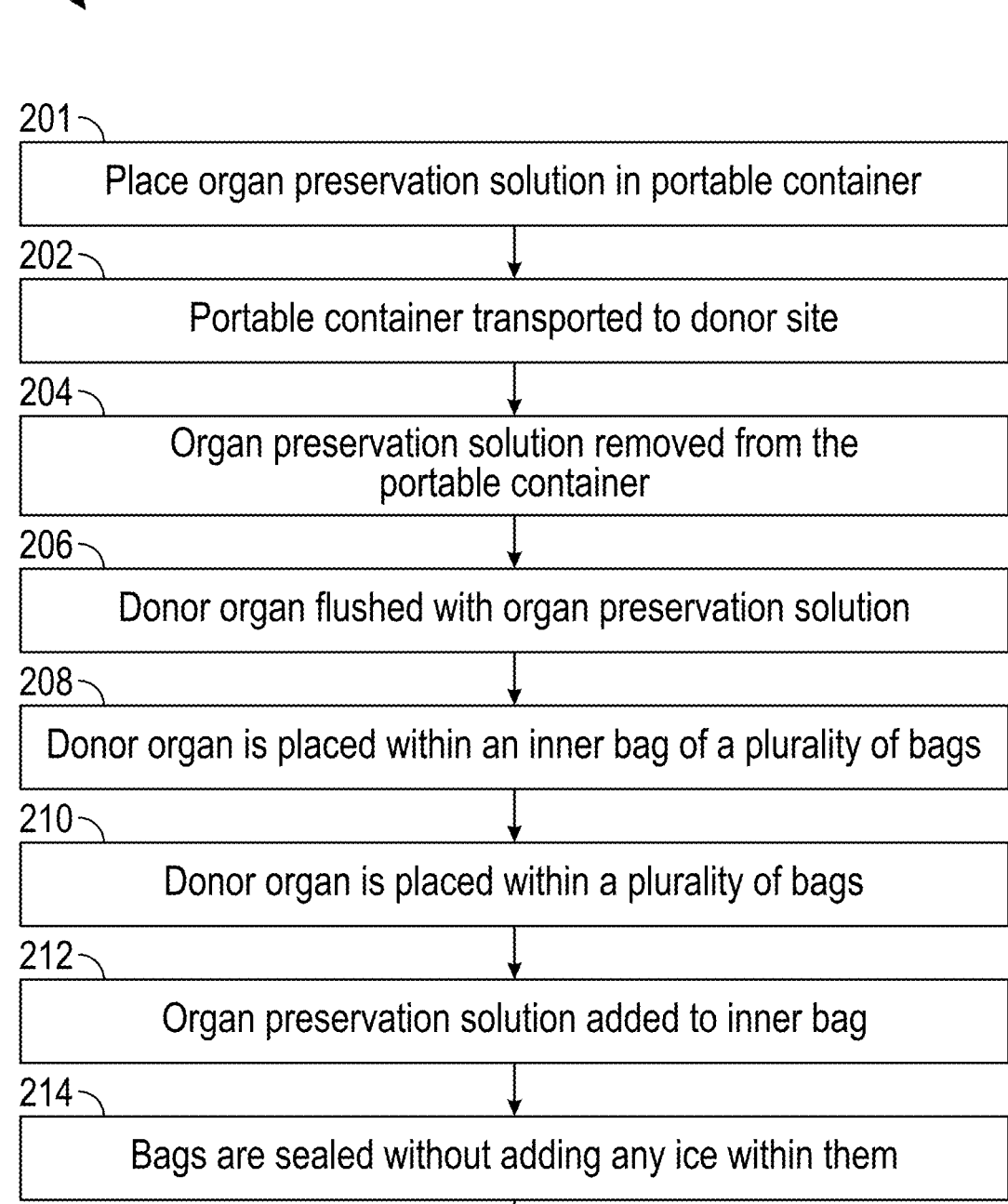

201

Place organ preservation solution in portable container

202

Portable container transported to donor site

204

Organ preservation solution removed from the portable container

206

Donor organ flushed with organ preservation solution

208

Donor organ is placed within an inner bag of a plurality of bags

210

Donor organ is placed within a plurality of bags

212

Organ preservation solution added to inner bag

214

Bags are sealed without adding any ice within them

216

Bagged donor organ placed within portable container and stored

FIG. 2

SYSTEMS, DEVICES, AND METHODS FOR PRESERVING AN ORGAN FOR TRANSPLANTATION

CROSS-REFERENCE TO RELATED APPLICATION

This application is a continuation of U.S. patent application Ser. No. 18/888,672, filed Sep. 18, 2024, which claims the benefit of U.S. Provisional Application No. 63/583,926 filed Sep. 20, 2023, the entire contents of each of which are incorporated herein by reference.

FIELD

The present disclosure relates to organ preservation, and more particularly, to organ preservation prior to transplantation.

BACKGROUND

Preserving a donor organ ex vivo requires very careful handling to ensure that the donor organ remains viable for transplantation. Without proper handling, the donor organ can become damaged beyond repair, ruining the chances for that organ to potentially save a life. In particular, donor lungs can be especially challenging to preserve ex vivo. Currently, only about one in four donor lungs are suitable for transplant, and approximately one in five people waiting for a donor lung dies before they can receive a donor lung.

Conventional methods for donor organ preservation include removing the organ from the donor and placing it on ice. The donor organ remains on ice until it is ready to be transplanted into a recipient. Typically, the donor organ must be transplanted within 6-8 hours after being removed from the donor, or it risks suffering irreparable injury rendering it unfit for transplantation.

SUMMARY

A method for storing a donor organ includes storing the donor organ in a portable storage container that keeps the donor organ cool without using ice. The portable storage container may be configured to keep the donor organ at a temperature in a range of, for example, 8 to 12 degrees Celsius (C). By storing the donor organ at a cool temperature that is higher than that achievable with ice, the donor organ can be stored for longer periods of time.

According to an aspects, a method of storing a donor organ prior to implantation into an organ recipient includes bagging a donor organ that has been removed from an organ donor by placing the donor organ into at least one bag and sealing the at least one bag without including any ice in any of the at least one bag within which the donor organ is bagged; placing the bagged donor organ into a portable storage container configured to maintain the donor organ at a temperature of at least 8 degrees Celsius (C) during storage; and storing the donor organ in the portable storage container at the temperature of at least 8 degrees C. prior to transplanting the donor organ into the organ recipient.

Bagging the donor organ may include placing an organ preservation solution in the at least one bag. The organ preservation solution may have been stored in the portable storage container prior to placing the bagged donor organ into the portable storage container. Bagging the donor organ may include bagging the donor organ in a plurality of bags, wherein an inner bag of the plurality of bags comprises the organ preservation solution.

The portable storage container may include at least one cooling pack configured to transition from a solid to a liquid at a temperature of at least 8 degrees Celsius.

The method may include, prior to bagging the donor organ, transporting the portable storage container from a first site to a second site where the organ donor is located, removing an organ preservation solution from the portable storage container, and flushing the donor organ with the organ preservation solution. The method may include flushing the donor organ with the organ preservation solution prior to removing the donor organ from the organ donor. The method may include, prior to transporting the portable storage container from the first site to the second site, removing the organ preservation solution from a refrigerator and placing the organ preservation solution into the portable storage container. The method may include placing at least one cooling pack in the portable storage container, wherein the at least one cooling pack is configured to maintain the temperature of the donor organ at 8 to 12 degrees C. within the portable storage container during storage of the donor organ.

The donor organ may be maintained at the temperature of 8 to 12 degrees C. within the portable storage container during storage. The method may include, after storing the donor organ in the portable storage container, removing the donor organ from the portable storage container, and transplanting the donor organ into the organ recipient. The donor organ may be stored within the portable storage container for at least 1 hour.

Storing the donor organ in the portable storage container may include transporting the portable storage container from a site where the donor organ was removed to a site where the donor organ is to be transplanted. Optionally, the portable storage container does not contain any ice at any time during storage of the donor organ.

According to an aspect, an organ transportation apparatus includes an insulating enclosure comprising a compartment configured to contain a bag enclosing an organ; and phase-change material, wherein the organ transportation apparatus is configured to maintain the compartment at a temperature of 8 to 12 degrees C. for a predetermined minimum period.

The phase-change material may have a transition temperature of around 8 degrees C. The phase-change material is plant-derived. The phase-change material may be contained within a preformed container. The phase-change material may include a dye that changes color based on temperature.

The enclosure may include a removable lid that is held closed by latches. The lid may hold at least some of the phase-change material. The enclosure may be made of a recyclable material.

The apparatus may include a temperature monitor. The temperature monitor may include a temperature probe configured to be in contact with the bag containing the organ. The temperature monitor may be configured to wirelessly connect with a mobile device, and wherein mobile device may be used to start or stop temperature logging, monitor an internal temperature, and/or transfer temperature logs.

The apparatus may include wheels to facilitate transportation. The apparatus may include at least one handle to facilitate transportation of the apparatus. At least one handle may facilitate lifting of the apparatus. The apparatus may include a lid that comprises a document pouch for holding documents associated with an organ contained within the apparatus. The apparatus may include a cradle configured to limit movement of the bag containing the organ during transportation.

According to an aspect, a method of transporting an organ from a donor site to a transplant site includes: transporting the organ from the donor site to the transplant site inside the apparatus of claim 15, wherein an internal temperature of the apparatus is maintained at a temperature in a range of 8 to 12 degrees C. throughout the transportation.

The phase-change material may be cooled to 4 degrees C. prior to loading into the apparatus. The method may include, prior to transporting the organ, loading an organ preservation solution into the apparatus prior to the apparatus being transported to the donor site so that the organ preservation solution is at a temperature of about 8 degrees C. for flushing the organ. The organ preservation solution may be removed from the apparatus before retrieval of the organ and the organ may be placed inside the apparatus after retrieval and flushing with the organ preservation solution.

The method may include communicating with a temperature monitor of the apparatus by an application running on a mobile device carried by an organ recovery personnel. The method may include transmitting, by the application running on the mobile device, temperatures of the apparatus and location information to a server for access by remote personnel. The method may include determining, by the application running on the mobile device, that a temperature inside the apparatus exceeds a predetermined threshold and providing a notification in response. The method may include at least one of: (a) starting and/or stopping temperature logging, (b) retrieving temperature logs, and (c) storing temperature logs on a server for long-term storage by the application running on the mobile device.

BRIEF DESCRIPTION OF THE DRAWINGS

The invention will now be described, by way of example only, with reference to the accompanying drawings, in which:

FIG. 2 is a flow diagram of an exemplary method in which organ preservation solution is used for storing the donor organ;

DETAILED DESCRIPTION

Figure 1:
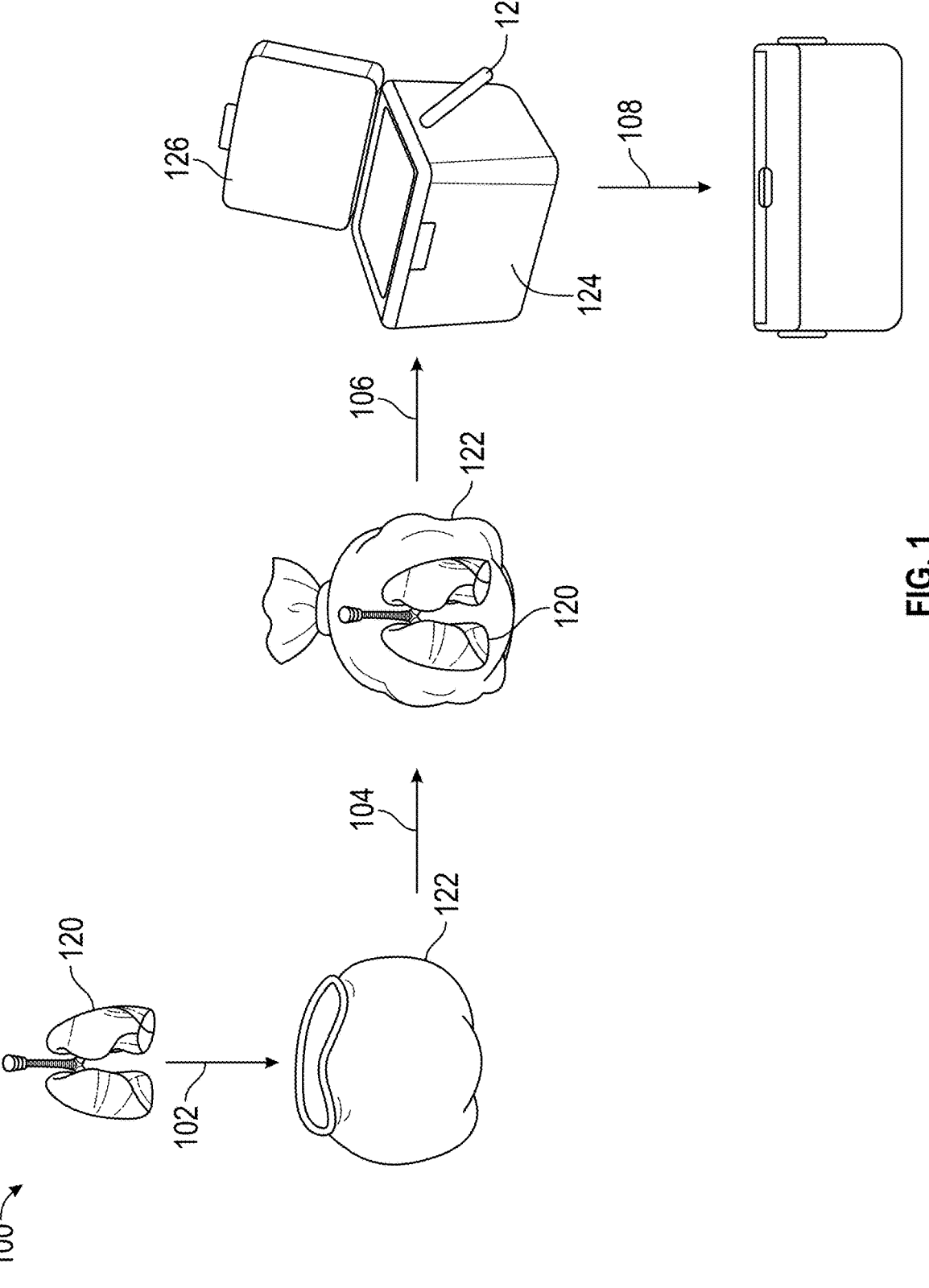
FIG. 1 is a diagrammatic illustration of an exemplary method of storing a donor organ prior to implantation into an organ recipient.

Described herein are systems, devices, and methods for storing a donor organ without ice prior to transplanting the donor organ into an organ recipient. The donor organ is stored in a portable storage container configured to maintain the donor organ at temperature that is higher than a temperature achievable by conventional methods. Conventional donor organ storage methods including storing the donor organ in a cooler on ice. These conventional methods can only preserve a donor organ for a limited period of time. By storing the donor organ at a cool temperature that is higher than that achievable with ice, according to the principles described herein, the donor organ can be stored for longer periods of time. Increasing the amount of time that a donor organ can be stored can increase the donor organ pool because, for example, organ donors and organ recipients can be located farther apart.

Static cold storage that includes storing a donor organ in a cooler on ice is a standard preservation technique for many donor organs. The goal of such static cold storage is to sustain cellular viability by reducing cellular metabolism. Static cold storage has historically been used to preserve donor lungs. Specifically, donor lungs are typically preserved in a cooler on ice until they can be transplanted into a recipient. A cooler with ice typically stores the donor lung at temperatures of 2-6 degrees C. However, not only does this technique only allow the donor lung to be preserved for short periods (e.g., less than 6-8 hours), it also reduces the viability of the donor lung by damaging the lung's mitochondrial health. This is problematic because mitochondrial health of a donor lung has been shown to have a direct effect on the success rate of the lung transplantation. Thus, a lung having a compromised mitochondrial health is more likely to also have a compromised transplantation outcome.

However, preserving donor lungs using static cold storage at slightly higher temperatures (e.g., 8-12 degrees C.), according to the principles described herein, can achieve longer preservation periods, such as preservation periods of greater than 6-8 hours, while still achieving successful transplantation outcomes. This higher temperature maintains the mitochondrial health of the donor lung better than that of static cold storage at the lower temperature. For example, the inventors have discovered that the levels of the mitochondrial-related metabolites itaconate, glutamate, and N-acetylglutamine are greater in donor lungs that have been preserved at 36 hours and 10 degrees C., according to the methods, systems, and devices described herein, than in donor lungs that have been preserved at 4 degrees C. according to conventional methods and devices. The higher levels of these mitochondrial-related metabolites after preservation indicate that donor lungs preserved using static cold storage for 36 hours at 10 degrees C., according to the methods, systems, and devices described herein, have improved mitochondrial health than the donor lungs preserved at 4 degrees C. Accordingly, these static cold storage preservation at higher temperatures, according to the principles described herein, are able to achieve longer preservation periods while better maintaining the mitochondrial health of donor lungs.

A portable storage container for storing a donor organ at temperatures that prolong storage time, as discussed above, can include one or more cooling packs that are configured to keep a donor organ stored in the storage container cool but at a temperature above that achieved using ice. A donor organ can be sealed within at least one bag and placed in the storage container. Organ preservation solution can be included in the at least one bag so that the donor organ is in direct contact with the preservation solution.

The portable storage container can be configured to store organ preservation solution prior to use. The portable storage container with the stored organ preservation solution can be shipped to a site of an organ donor. The organ preservation solution can then be used to flush the donor organ prior to placing the donor organ in the bag(s) with the organ preservation solution.

The methods, systems, and devices provided herein may be used to preserve any organ suitable for transplantation. Some examples described below use lungs as an example of an organ suitable for preservation using the methods, systems, and devices described herein. However, other suitable organs can include kidneys, livers, hearts, pancreas, intestines, hands, and/or faces.

In the following description, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

FIG. 1 is a diagrammatic illustration of a method 100 of storing a donor organ prior to implantation into an organ recipient, according to an aspect of the present disclosure. At step 102, a donor organ 120 that has been removed from an organ donor is bagged by placing the donor organ into at least one bag 122. The donor organ 120 can be placed in multiple bags. For example, the donor organ 120 can be placed in an inner bag which is located within one or more additional bags. In some examples, the donor organ 120 is placed within three bags. At step 104, the at least one bag 122 is sealed. When multiple bags are used, each bag can be sealed separately (e.g., an inner bag can be sealed and then an outer bag can be sealed) or the multiple bags can be sealed together (e.g., a tie can be tied around the bags simultaneously).

At step 106, the sealed bag 122 with the donor organ 120 within is placed into a portable storage container 124. The portable storage container 124 can be configured to maintain the donor organ at a cool temperature but above a temperature that the donor organ would be if ice were used within the portable storage container 124, as in conventional methods. For example, the portable storage container 124 can be configured to maintain the donor organ at a temperature that is at least 8 degrees C. during storage. The portable storage container 124 may include one or more cooling packs that, together with the insulative construction of the walls of the portable storage container 124, maintain the donor organ at a temperature that is at least 2 degrees C. for a desired storage period. Additionally or alternatively, the portable storage container 124 may include a powered cooling system, such as a battery powered refrigeration system. The portable storage container 124 can be closed, such as by closing a lid 126 of the portable storage container 124. At step 108, the donor organ 120 is stored in the portable storage container 124 for a storage period.

A storage container 124 with a donor organ stored within can be placed in a storage location of the same facility in which the donor organ was removed from the organ donor until an organ recipient is ready for transplantation. Additionally, or alternatively, the portable storage container 124 can be transported to a different facility, such as to a storage facility or to a facility where the organ recipient will receive the transplant. For example, the portable storage container 124 with a donor organ stored within can be loaded onto one or more vehicles, such as one or more cars, trucks, buses, and/or aircraft, and transported to a storage facility and/or to a location where the donor organ will be transplanted into the organ recipient. The portable storage container 124 may be configured to be hand carried (e.g., may include a handle 128 for a carrier to carry the portable storage container 124).

At a suitable time, the donor organ 120 may be removed from the storage container 124. The donor organ 120 may be transplanted into an organ recipient. Prior to transplanting the donor organ in the organ recipient, the organ may undergo one or more preparation procedures. For example, the donor organ may be perfused with perfusion solution to increase the healthiness and/or to repair the donor organ.

The donor organ 120 may be removed from the storage container 124, undergo one or more procedures, and then placed back into the storage container 124 for additional storage. For example, the donor organ 120 may be removed from the storage container 124, perfused with an organ perfusion solution to increase the amount of time the donor organ can be preserved, and then placed back in the storage container 124 for additional storage. During perfusion of the donor organ, a temperature of the donor organ may be increased, such as to a normothermic temperature, and then decreased back to a suitable temperature (e.g., 8-12 degrees C.) for storage in the portable storage container 124. This process may be repeated multiple times.

Though minimizing the period of storage of a donor organ is generally preferable, the maximum period of storage of the donor organ in the portable storage container provided by the storage methods and/or storage containers described herein can be at least 2 hours, preferably at least 4 hours, more preferably at least 6 hours, more preferably at least 8 hours, more preferably at least 10 hours, more preferably at least 12 hours, more preferably at least 14 hours, more preferably at least 16 hours, more preferably at least 24 hours, more preferably at least 30 hours, more preferably at least 36 hours, more preferably at least 42 hours, or more preferably at least 48 hours. The maximum period of storage of the donor organ in the portable storage container provided by the storage methods and/or storage containers described herein can be up to 8 hours, preferably up to 10 hours, more preferably up to 12 hours, more preferably up to 14 hours, more preferably up to 16 hours, more preferably up to 24 hours, more preferably up to 30 hours, more preferably up to 36 hours, more preferably up to 42 hours, or more preferably up to 48 hours.

The portable storage container (including one or more cooling packs or other cooling feature) can be configured to maintain the donor organ while stored in the portable storage container at a temperature of at least 6 degrees C., at least 8 degrees C., or at least 10 degrees C. The portable storage container can be configured to maintain the donor organ at a temperature of up to 8 degrees C., up to 10 degrees C., up to 12 degrees C., or up to 14 degrees C. The portable storage container can be configured to maintain a donor organ within a temperature range of 6-14 degrees C., 7-13 degrees C., 8-12 degrees C., or 9-11 degrees C. The portable storage container can be configured (e.g., via insulative characteristics, configuration of cooling packs, number of cooling packs, temperature of cooling packs, characteristics of phase-change material within cooling packs, etc.) to maintain the donor organ at any of the temperatures and temperature ranges in this paragraph for at least a predetermined minimum period of time, such as a period of at least 1 hour, at least 2 hours, preferably at least 4 hours, more preferably at least 6 hours, more preferably at least 8 hours, more preferably at least 10 hours, more preferably at least 12 hours, more preferably at least 14 hours, more preferably at least 16 hours, more preferably at least 24 hours, more preferably at least 30 hours, more preferably at least 36 hours, more preferably at least 42 hours, or more preferably at least 48 hours. The portable storage container can be configured to maintain the donor organ at any of the temperatures and temperature ranges in this paragraph for a period of up to 8 hours, preferably up to 10 hours, more preferably up to 12 hours, more preferably up to 14 hours, more preferably up to 16 hours, more preferably up to 24 hours, more preferably up to 30 hours, more preferably up to 36 hours, more preferably up to 42 hours, or more preferably up to 48 hours.

In some examples, method 100 can include using organ preservation solution for storing the donor organ. FIG. 2 is a flow diagram of an example of method 100 in which organ preservation solution is used for storing the donor organ. Method 200 may include step 201 in which organ preservation solution is placed in a portable storage container, such as storage container 124 of FIG. 1. Method 200 includes step 202 in which the portable storage container is transported to a donor site. The portable storage container may be prepared by an organ retrieval team transported to the donor site by the organ retrieval team or by a third party. Transporting the portable storage container can include moving the portable storage container within the same facility from a location of storage of the portable storage container to the location of the organ donor. Transporting the portable storage container can include transporting the portable storage container from one facility, such as a storage facility or facility where transplanting of the organ into the organ recipient is to occur, to a facility where the organ donor is located.

At step 204, organ preservation solution stored in the portable storage container is removed from the portable storage container. The portable storage container can be opened and one more bags of the organ preservation solution can be removed from the portable storage container, such as by a member of the organ retrieval team. The organ preservation solution, when removed from the portable storage container, can be at a temperature that is suitable for storing the donor organ when. For example, the organ preservation solution can be at a temperature of at least 2 degrees C., at least 4 degrees C., at least 6 degrees C., at least 8 degrees C., or at least 10 degrees C. when removed from the portable storage container. The organ preservation solution can be at a temperature of up to 8 degrees C., up to 10 degrees C., up to 12 degrees C., or up to 14 degrees C. when removed from the portable storage container. The organ preservation solution can be at a temperature that is within a temperature range of 2-14 degrees C., 3-13 degrees C., 4-12 degrees C., 4-10 degrees C., 4-8 degrees C., or 6-8 degrees C. when removed from the portable storage container. The organ preservation solution may have been loaded into the portable storage container prior to transporting the portable storage container to the donor site. The organ preservation solution may have been loaded into the portable storage container by a member of a donor retrieval team. The organ preservation solution may have been stored in one or more refrigerators that maintained the organ preservation solution at a desired temperature, such as any of the temperatures listed herein. The portable storage container may have then been closed (and, optionally, sealed) and transported to the donor site. The portable storage container may maintain a temperature of the organ preservation solution within a desired range, such as any of the temperature ranges described herein.

Optionally, the organ preservation solution is stored on ice and step 204 can include removing organ preservation solution from its ice storage. For example, the organ preservation solution may be transported separately from the portable storage container to the donor site (e.g., at the same time but in a different container or at a different time).

At step 206, the donor organ is flushed with the organ preservation solution. The donor organ can be flushed while still in the donor's body. For example, ports can be made in the donor organ for supplying and removing organ preservation solution. The organ preservation solution can be gravity fed into the donor organ and gravity drained or suctions from the donor organ. Alternatively, a pumping system can be used to pump organ preservation solution into and/or out of the donor organ. In some examples, the donor organ is removed from the donor prior to flushing.

At step 208, the donor organ is placed within at least one bag. The donor organ may have been removed from the donor before or after being flushed with the organ preservation solution. The donor organ may be placed within multiple bags, one inside the other (e.g., "triple bagged"). At step 210, at least some of the organ preservation solution from the portable storage container is added to the bag(s) so that the donor organ is in contact with the organ preservation solution. For example, the donor organ and organ preservation solution may be added to an inner bag of a plurality of bags. The organ preservation solution added to the bag can include at least some of the organ preservation solution used to flush the donor organ in step 206 or can not include any of the organ preservation solution used to flush the donor organ. Any suitable amount of organ preservation solution may be added to the bag with the donor organ. The amount of organ preservation solution may depend on the type and/or size of the donor organ. In some examples, the donor organ is a lung and about 3 liters of organ preservation solution is added to the bag with the donor organ. However, this amount is merely exemplary, and it will be understood by a person of skill in the art that a greater amount or a lesser amount of organ preservation solution may be added to the bag with the donor organ.

At step 210, the bag(s) are sealed without any ice having been added to any of the bags. At step 212, the bagged donor organ is placed into the portable storage container and the portable storage container is closed. No ice is added to the portable storage container, meaning that the donor organ is stored within the portable storage container without the use of any ice. As explained above, the portable storage container is configured to maintain a temperature of the donor organ at a temperature that is higher than the 4 degrees C. achieved with ice, which can lead to increased storage times.

The donor organ is stored in the portable storage container for a desired period of time. The portable storage container may be stored in the same facility for future use or may be transported to a different facility, such as a facility where the donor organ recipient is located, which could be within the same city, in a different city, different state, and/or different country. The portable storage container may be transported by a member of an organ retrieval team, may be transported via one or more commercial carriers, and/or may be transported in any other suitable fashion. The portable storage container may be sufficiently small to be hand carried or rolled while being transported.

Any suitable organ preservation solution can be used in method 200. Examples of suitable organ preservation solutions include solutions with a low-potassium dextran composition, such as Perfadex™.

Figure 3:
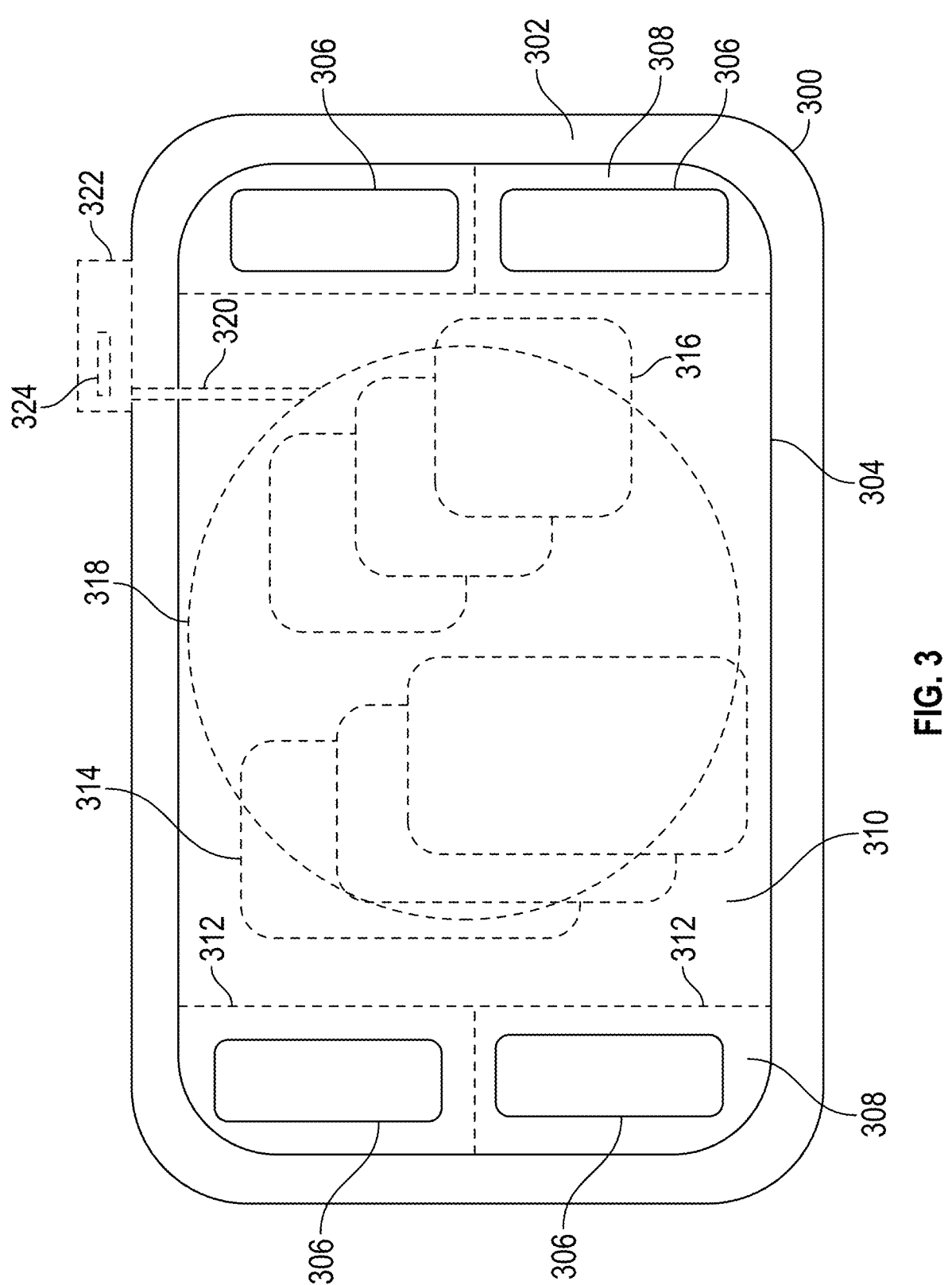
FIG. 3 illustrates an exemplary portable storage container for use the methods of FIG. 1 and FIG. 2.

FIG. 3 illustrates an exemplary portable storage container 300 for use in any of methods 100 and 200. The portable storage container 300 includes insulated walls 302 forming an insulating enclosure that includes at least one compartment 304. The walls 302 may be made of or include one or more recyclable materials, such as expanded polypropylene. The at least one compartment 304 may include one or more cooling packs 306. The one or more cooling packs 306 may be configured to maintain a temperature within the portable storage container 300 within a range that is suitable for storing a donor organ for a desired amount of time. For example, the one or more cooling packs 306 when placed within the portable storage container 300 may be configured to maintain a temperature within the portable storage container 300 that is within any of the ranges described herein and for any of the time periods described herein. The one or more cooling packs can include a phase-change material having a transition temperature greater than 0 degrees C. The one or more cooling packs can be, for example, eutectic gel packs. The eutectic gel packs may be configured to transition from solid to liquid in a range of 6-12 degrees C., preferably in a range of 8-10 degrees C., such as around 8 degrees C. or around 10 degrees C. (in this context, around means +/− less than 1 degree C.). Optionally, the phase-change material is plant-derived (i.e., bio-based), such as materials derived from renewable and environmentally friendly resources, including food-grade materials such as palm kernel oil, palm oil, coconut oil, and soybean oil. The phase-change material may include at least one color-sensitive dye that changes color depending on the temperature of the phase-change material. The dye may be a first color when the phase-change material is in a solid state and may be a second color when the phase-change material is in a liquid phase. The phase-change material may be contained within a housing that permits observation of the color of the phase-change material (e.g., the housing may be transparent or translucent). Optionally, the phase-change material includes several different dyes that have different color-change temperatures so that an observer may ascertain the temperature of the cooling pack beyond just that it is below or above its transition point. This may be particularly useful for enabling a user to know how long to keep the cooling pack in a refrigerator before using it in the portable container. A color-changing dye can be used that changes color at the maximum temperature that the cooling pack should be for use in a portable container. For example, it may be desirable for a cooling pack to be cooled to 4 degrees C. before using placing it into a portable container (such as step 201 of method 200), and the phase-change material may include a dye that changes color at 4 degrees C. so that the user knows when it is cool enough to use. One or more dyes that change color at temperatures above the transition temperature of the phase-change material may be used so that a user can readily ascertain the temperature reached within the container at the end of a storage session.

A number of cooling packs 306 within the portable storage container 300 may be selected based on an expected time that the cooling packs 306 will need to maintain the desired temperature. For example, the number of cooling packs 306 can be selected based on an "expected total cooling time" that is the time for the portable storage container to be transported to a site of a donor, loaded with a donor organ, and transported to a site of an organ recipient. The number of cooling packs 306 can be linearly associated with the expected total cooling time. For example, twice as many cooling packs 306 may be needed for twice the expected total cooling time. The at least one compartment 304 can include one or more sub-compartments 308 for placing the one or more cooling packs 306. The one or more sub-compartments 308 may be separated from a main compartment 310 by one or more separators 312 and/or may be formed by one or more pockets attached to the wall 302 of the portable storage container 300, to an interior bottom of the portable storage container 300, and/or to an underneath of a lid of the portable storage container 300. The main compartment 310 may be sized and shaped to fit the bagged donor organ 318. Optionally, the main compartment 310 is sized and shaped to closely fit the bagged donor organ 318 to minimize movement of the organ during transport.

The portable storage container 300 can be used to transport one or more bags 314 of organ preservation solution and maintain the organ preservation solution at a desired temperature, as described above with respect to step 204 of method 200. The one or more organ preservation solution bags 314 can be placed in the portable storage container 300 when the portable storage container 300 is prepared for transporting to a donor site. For example, a member of an organ retrieval team may prepare the portable storage container 300 by removing the organ preservation solution bags 314 from a refrigerator and placing the organ preservation solution bags 314 in the portable storage container 300. The member of the organ retrieval team may remove any suitable number of cooling packs from a refrigerator (the same refrigerator from which the organ preservation solution bag was held in or a different one at a different temperature and place them in the portable storage container 300. For example, the cooling packs may be stored in a refrigerator that maintains the cooling packs at a desired temperature (e.g., 4 degrees C.) and the cooling packs may be removed from the refrigerator, placed in the portable storage container 300 (e.g., along with the organ preservation solution bag), and the portable storage container 300 can be closed and transported to the donor site. Optionally, after the cooling packs have been used to transport an organ, the cooling packs may be returned to the refrigerator for cooling to the desired temperature (or one or more of the cooling packs may be discarded).

The portable storage container 300 can be used to store one or more organ storage bags 316 that are used at the donor site to place the donor organ into as described above with respect to step 102 of method 100. The one or more organ storage bags 316 can be placed in the portable storage container 300 when the portable storage container 300 is prepared for transporting to a donor site. For example, a member of an organ retrieval team may prep the portable storage container 300 by placing the organ storage bags 316 in the portable storage container 300 (e.g., along with the cooling packs).

Once the donor organ has been flushed with the organ preservation solution from the organ preservation solution bags 314 and sealed along with the organ preservation solution in the organ storage bags 316, the bagged donor organ 318 can be placed within the portable storage container 300. The lid of the portable storage container 300 (not shown but see exemplary lid 126 of FIG. 1) can then be closed and the donor organ stored within the portable storage container 300 for a desired amount of time.

The portable storage container may include one or more monitoring units 322 that may monitor one or more parameters of the portable storage container 300 and/or one or more aspects of its use. For example, the portable storage container 300 may include one or more temperature sensors 320 that monitor a temperature within the portable storage container 300 and/or a temperature of the bagged donor organ 318 contained within the container 300, and the one or more temperature sensors 320 may be operatively connected to the monitoring unit 322, which may monitor the temperature over time. Optionally, a temperature sensor 320 may contact the bagged donor organ 318. For example, the temperature sensor 320 may be positioned so that the bagged donor organ 318 sits at least partially on top of the temperature sensor 320 such that contact is maintained between the bagged donor organ 318 and the temperature sensor 320 due to gravity. The monitoring unit 322 may include a display 324 for displaying one or more of the monitored parameters. For example, the display 324 may be used to display a temperature (e.g., a current temperature or a max temperature). In some examples, the monitoring unit 322 stores temperature readings for later retrieval. For example, a user device, such as a mobile device like a smartphone, tablet, laptop, etc., or other electronic device, running an application configured to interfacing with the monitoring unit 322, can connect to the monitoring unit 322 (e.g., via an application running on a smartphone or other computing device), via a wired or wireless connection, and can view and/or download temperature readings (or any other parameter values) stored by the monitoring unit 322, which can be used to verify that the organ remained within a desired range of temperatures during transport. Data downloaded from the monitoring unit 322 to the user device via the application can be uploaded to a server (e.g., a cloud server) for long-term storage and/or access by other personnel. Optionally, the application running on the user device can be used to control one or more functions of the monitoring unit 322, such as to start and/or stop sensor reading logging, change a frequency of logging, set alarm limits, set calibration parameters, etc. For example, a member of an organ retrieval team may use an application running on a mobile device to initiate temperature logging, such as when the portable storage container 300 has been loaded with organ preservation solution and/or cooling packs 306 for transportation to a donor site and/or once an organ has been loaded into the portable storage container 300. In some examples, the monitoring unit 322 can provide an alarm or other indication to a user when a preset temperature is reached within the portable storage container 300 that is above an acceptable amount. Additionally or alternatively, an application running on a user's electronic device (e.g., smartphone) may receive temperature updates from the monitoring unit 322 and may provide alerts based on the temperature updates, such as an alarm (e.g., visual, audible, and/or haptic) when the temperature is above a predetermined threshold. Optionally, the one or more temperature sensors 320 may be non-electronic sensors that a user may observe to determine a maximum temperature reached in the portable storage container. For example, one or more sensors may include color changing chemical compositions that change colors at defined temperatures, and a user may open the portable storage container and observe the color(s) of the sensor(s) to determine the temperature reached within the portable storage container.

Optionally, a user's portable computing device, such as a smartphone running a suitable application, can be connected (e.g., wirelessly) to the monitoring unit 322 over a period of time and can monitor sensor readings from the monitoring unit 322 over the period of time. For example, where a member of an organ retrieval team maintains custody of the portable storage container 300 during transportation, the user's mobile device can be continuously connected to the monitoring unit 322 (e.g., via a Bluetooth connection or other suitable connection) and can continuously receive temperature readings. The application running on the mobile device may analyze the temperature readings, such as for providing an over-temperature warning and/or may upload the readings to a server (e.g., cloud server) for monitoring by remote personnel. The application running on the mobile device may upload location data to a server that may enable remote personnel to monitor the progress of the organ transportation. Thus, a remote user may be able to monitor the location and internal temperature of the portable storage container 300 (such as via an application or website). Optionally, the portable storage container 300 has a location tracking system that can transmit location information to, for example, a server for retrieval by remote personnel.

The one or more monitoring units 322 can monitor other parameters, such as location (e.g., by including or being operatively connected to a GPS receiver), time in use, motion (e.g., by including an internal measurement unit to monitor whether the portable storage container is knocked over and/or falls), external temperature, lid opening occurrences, and/or any other parameters associated with use of the portable storage container 300.

Figure 4:
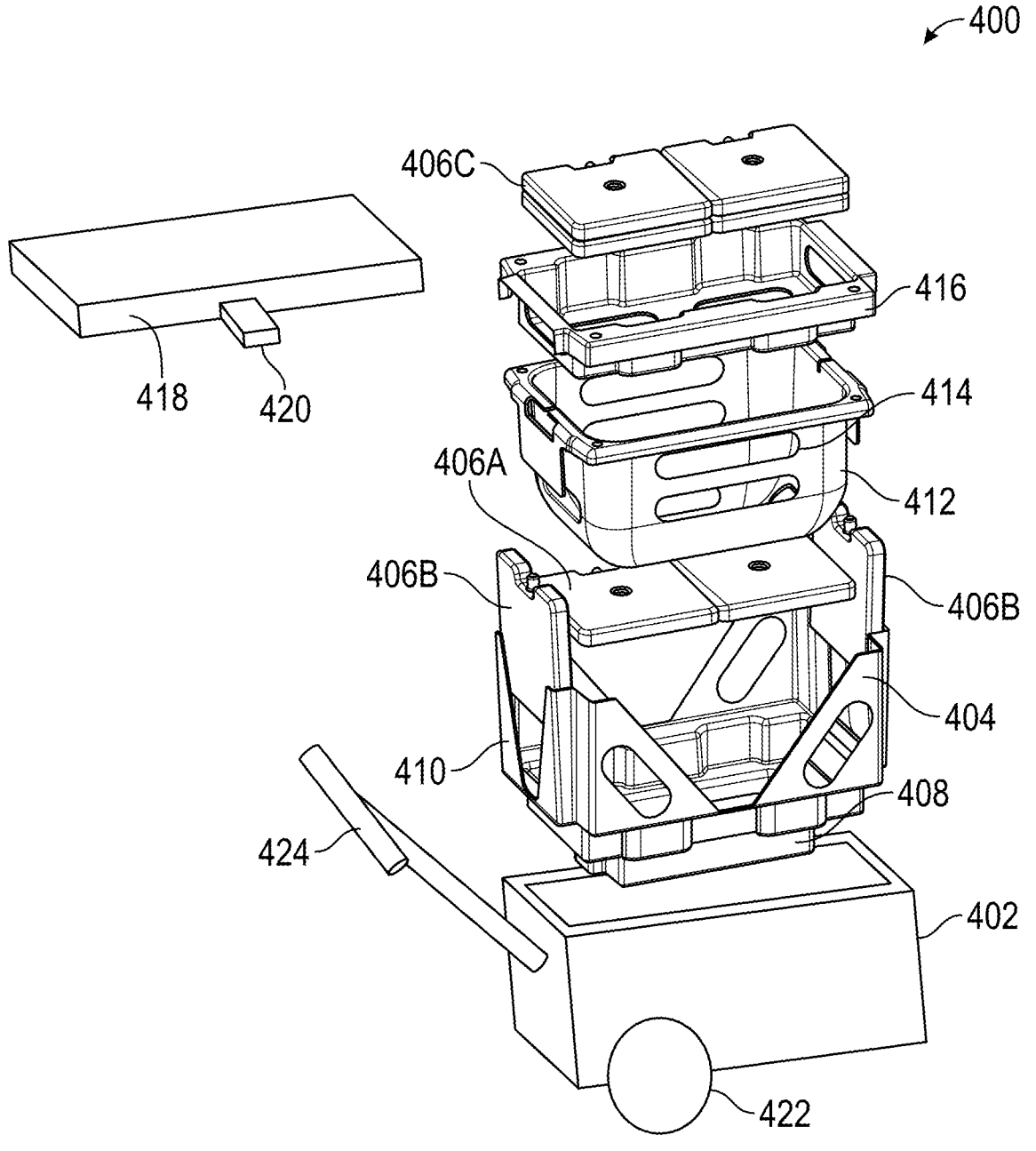
FIG. 4 is an exploded view of components of an exemplary portable storage container.

FIG. 4 is an exploded view of components of an exemplary portable storage container 400. The container 400 can be a reusable container or a disposable container. The container 400 includes an insulative housing 402, which is made to insulate the contents held within the container 400. For example, the housing 402 may include Styrofoam or other insulative material, a multi-wall structure with insulative material, air, or vacuum between, or any other suitable structure for insulating the contents stored within. The container 400 can include a lid (not shown), which can seal to the top of the container 400 to insulate the contents within. A bottom insert 404 can fit within the housing. The bottom insert 404 or a component held therein may be shaped to closely fit a bagged organ to minimize movement of the bagged organ during transport. The bottom insert 404 can have a first pocket or brackets 408 for inserting one or more cooling packs 406A. The bottom insert 404 can have one or more side pockets or brackets 410 for receiving one or more cooling packs 406B (though not shown, cooling packs can be placed on the other sides of the bottom insert 404 additionally or alternatively). Any of the cooling packs 406A, 406B can have a housing with a fixed (e.g., brick-like) shape that maintains its shape regardless of the condition of the phase-change material within or can have a housing that is flexible (e.g., bag-like). Once the bottom insert 404 is inserted in the housing 402 and the cooling packs 406A,B are inserted into the bottom insert 404 (this can be done in any order), an organ cradle 412 may be positioned within the bottom insert 404. The organ cradle 412 can include one or more openings 414 for cool air to circulate. The organ cradle 412 can be used to hold an organ (e.g., an organ contained in an organ storage bag, which may be filled with organ preservation solution) for transport and/or can be used to hold organ perfusion solution during transport to a donor site. The organ cradle 412 may be shaped to closely fit a bagged organ to reduce movement of the bagged organ during transportation. A top insert 416 fits into a top of the organ cradle 412 and holds one or more cooling packs 406C. With this arrangement, cooling packs can be positioned around all sides of the organ cradle 412.

The container 400 may include a lid 418. The lid 418 may be hingedly attached to the housing 402 or may be completely removable from the housing 402. The lid 418 may include one or more latches 420 for latching the lid 418 to the housing 402. One or more latches 420 may be keyed to prevent unauthorized access to an organ contained within the container 400. The lid 418 may hold one or more cooling packs. For example, the top insert 416 may be part of or may assemble to the lid 418 for holding one or more cooling packs 406C. The lid 418 or any other component of the container 400 may include a document pouch for holding documents that may pertain to an organ being transported in the container 400.

The container 400 may include one or more wheels 422 to facilitate transport of the container 400. The container 400 may include one or more handles 424 (e.g., a telescopic handle or foldaway handle) for pulling the container 400 when wheeled and/or for facilitating lifting of the container 400.

Portable storage containers, such as container 124, container 300, and container 400, can be configured (e.g., a combination of the insulative construction and the configuration, quantity, placement, and/or starting temperature of the cooling packs) to maintain a temperature within the container during storage and/or transportation that is within any of the temperature ranges described herein. For example, the portable storage container can be configured to maintain an internal temperature from 8 to 12 degrees C. for the duration of an organ storage and/or transportation period, such as any of the time periods described within. For example, a portable storage container can be configured such that when it is loaded with a predetermined number of cooling packs (e.g., the cooling packs 406A, 406B, and 406C of FIG. 4) that are initially at a predetermined temperature (e.g., 4 degrees C.), the portable storage container can be transported to a donor site, loaded with an organ contained within a bag filled with preservation solution, and stored or transported to a transplant site while maintaining an internal temperature (at least during the period that the organ is contained within the container) of 8 to 12 degrees C. (or any other temperature range described herein).

In some embodiments, successful transplantation of a donor organ preserved using the storage devices and methods described herein may include treating the donor organ with an ex vivo organ perfusion (EVOP) technique after storage in the storage container to recondition the donor organ and prepare it for transplantation. Optionally, the EVOP can be used to prolong a period of preservation of the donor organ. A donor organ can be removed from the portable storage container, treated by EVOP (e.g., in a suitable EVOP system, such as described in U.S. patent application Ser. No. 17/915,086, filed Apr. 6, 2022, and titled Methods, Compositions and Systems for Enhancing Ex-Vivo Organ Perfusion), and then put back in storage, either in the portable storage container or in a refrigeration unit. EVOP and storage can be alternated as many times as desired. Optionally, cooling packs within the portable storage container can be swapped out as needed.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method of storing a donor organ that has been removed from an organ donor prior to implantation into an organ recipient comprising:

transporting a portable storage container storing an organ preservation solution and at least one cooling pack within to a donor site, wherein the organ preservation solution and the at least one cooling pack are precooled;

removing the precooled organ preservation solution from the portable storage container at the donor site, the precooled organ preservation solution being at a temperature that is suitable for flushing of the donor organ and subsequent storage of the donor organ within the portable storage container;

flushing the organ with the organ preservation solution;

bagging the donor organ by placing the donor organ into at least one bag and sealing the at least one bag;

placing the bagged donor organ into the portable storage container, the portable storage container having the at least one precooled cooling pack therein; and storing the donor organ in the portable storage container prior to transplanting the donor organ into the organ recipient, wherein the portable storage container does not contain any ice at any time during storage of the donor organ and wherein the portable storage container and the at least one precooled cooling pack are configured to maintain the donor organ at a temperature of 8 to 12 degrees C. during storage.

2. The method of claim 1, wherein bagging the donor organ comprises placing an organ preservation solution in the at least one bag.

3. The method of claim 1, comprising flushing the donor organ with the organ preservation solution prior to removing the donor organ from the organ donor.

4. The method of claim 1, comprising, prior to transporting the portable storage container, removing the organ preservation solution from a refrigerator and placing the organ preservation solution into the portable storage container.

5. The method of claim 1, comprising, after storing the donor organ in the portable storage container, removing the donor organ from the portable storage container, and transplanting the donor organ into the organ recipient.

6. The method of claim 1, wherein storing the donor organ in the portable storage container comprises transporting the portable storage container from a site where the donor organ was removed to a site where the donor organ is to be transplanted.

7. A method of transporting an organ from a donor site to a transplant site comprising:

transporting a portable storage container storing an organ preservation solution and at least one cooling pack within to the donor site, wherein the organ preservation solution and the at least one cooling pack are precooled;

removing the precooled organ preservation solution from the portable storage container at the donor site, the precooled organ preservation solution being at a temperature that is suitable for flushing of the donor organ and subsequent storage of the donor organ within the portable storage container;

flushing the organ with the organ preservation solution;

bagging the donor organ by placing the donor organ and at least a portion of the precooled organ preservation solution into at least one bag and sealing the at least one bag;

placing the bagged donor organ into the portable storage container, the portable storage container having the at least one precooled cooling pack therein; and transporting the organ from the donor site to the transplant site inside a portable storage container, wherein the portable storage container and the at least one precooled cooling pack are configured to maintain the donor organ at a temperature of 8 to 12 degrees C. throughout transportation without the use of any ice.

8. The method of claim 7, comprising placing the precooled organ preservation solution into at least one organ preservation solution bag prior to the portable storage container being transported to the donor site.

9. The method of claim 7, comprising communicating with a temperature monitor of the portable storage container using an application running on a mobile device.

10. The method of claim 9, comprising transmitting, by the application running on the mobile device, temperatures of the portable storage container and location information to a server.

11. The method of claim 9, comprising determining, by the application running on the mobile device, that a temperature inside the portable storage container exceeds a predetermined threshold and providing a notification on the mobile device in response.

12. The method of claim 9, comprising at least one of: (a) starting and/or stopping temperature logging, (b) retrieving temperature logs, and (c) storing temperature logs on a server for long-term storage by the application running on the mobile device.

13. The method of claim 7, comprising:

placing the bagged organ into a cradle of the portable storage container, the cradle being configured to limit movement of the at least one bag within the portable storage container.

14. The method of claim 13, comprising:

placing a bottom insert into the portable storage container; and positioning the cradle within the bottom insert.

15. The method of claim 14, comprising placing at least one precooled cooling pack into a bottom compartment of the bottom insert.

16. The method of claim 14, comprising placing at least one precooled cooling pack into a side compartment of the bottom insert.

17. The method of claim 7, comprising, prior to placing at least one precooled cooling pack in the portable storage container, determining that a phase change material in the at least one cooling pack indicates that the at least one cooling pack has a temperature of at least 8 degrees C.

18. The method of claim 7, comprising:

removing the donor organ from the portable storage container; and performing ex vivo organ perfusion on the donor organ.

19. The method of claim 7, comprising:

removing the donor organ from the portable storage container; and transplanting the donor organ into a recipient.

20. The method of claim 7, wherein the temperature that is suitable for flushing of the donor organ and subsequent storage of the donor organ within the portable storage container is between about 4 to 12 degrees C.

21. The method of claim 7, wherein the temperature that is suitable for flushing of the donor organ and subsequent storage of the donor organ within the portable storage container is at least 8 degrees C.

* * * * *